United States Patent
Takae et al.

(10) Patent No.: US 10,766,469 B2
(45) Date of Patent: Sep. 8, 2020

(54) BRAKING CONTROL DEVICE AND BRAKING CONTROL METHOD

(71) Applicant: Nissan Motor Co., Ltd., Yokohama-shi, Kanagawa (JP)

(72) Inventors: Yasuhiko Takae, Kanagawa (JP); Takeshi Sugano, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/744,126

(22) PCT Filed: Jul. 27, 2015

(86) PCT No.: PCT/JP2015/071257
§ 371 (c)(1),
(2) Date: Jan. 12, 2018

(87) PCT Pub. No.: WO2017/017764
PCT Pub. Date: Feb. 2, 2017

(65) Prior Publication Data
US 2018/0201241 A1    Jul. 19, 2018

(51) Int. Cl.
*B60T 8/1755* (2006.01)
*B60T 8/1761* (2006.01)
(Continued)

(52) U.S. Cl.
CPC .......... *B60T 8/17552* (2013.01); *B60T 8/17* (2013.01); *B60T 8/17616* (2013.01);
(Continued)

(58) Field of Classification Search
CPC .... B60T 8/17552; B60T 8/17; B60T 8/17616; B60T 8/245; B60T 8/4827; B60T 13/662;
(Continued)

(56) References Cited

U.S. PATENT DOCUMENTS 2,914,358 A * 11/1959 Schjolin ................ B60T 11/103
188/106 R
4,281,736 A * 8/1981 Lizzio ..................... B60T 7/047
180/271
(Continued)

FOREIGN PATENT DOCUMENTS

| CN | 103140394 A | 6/2013 |
| CN | 104709273 A | 6/2015 |

(Continued)

*Primary Examiner* — Melody M Burch
(74) *Attorney, Agent, or Firm* — Global IP Counselors, LLP

(57) ABSTRACT

A braking control device is provided to automatically control a main braking device normally used to brake a host vehicle during travel and a second braking device used to maintain the host vehicle in a stopped state. The braking control device has a slip degree prediction unit and a braking device switching unit. The slip degree prediction unit predicts a possibility that the host vehicle will slip. The braking device switching unit is configured to delay a timing with which to start a reduction in a braking force of the main braking device if the slip degree prediction unit predicts a slip when switching the main braking device to the second braking device.

10 Claims, 11 Drawing Sheets

(51) Int. Cl.
*B60T 8/17* (2006.01)
*B60T 8/24* (2006.01)
*B60T 8/48* (2006.01)
*B60T 13/66* (2006.01)
*B60W 10/18* (2012.01)
*B60W 10/184* (2012.01)
*B60W 30/17* (2020.01)

(52) U.S. Cl.
CPC ............ *B60T 8/245* (2013.01); *B60T 8/4827* (2013.01); *B60T 13/662* (2013.01); *B60W 10/182* (2013.01); *B60W 10/184* (2013.01); *B60W 30/17* (2013.01); *B60T 2201/10* (2013.01); *B60W 2552/40* (2020.02); *B60W 2556/00* (2020.02); *B60Y 2400/81* (2013.01)

(58) Field of Classification Search
CPC ............ B60T 2201/10; B60W 10/182; B60W 10/184; B60W 30/17; B60W 2550/148; B60W 2600/00; B60Y 2400/81
See application file for complete search history.

(56) References Cited

U.S. PATENT DOCUMENTS

| | | | |
|---|---|---|---|
| 6,086,166 A * | 7/2000 | Fukasawa | B60L 3/0023 303/122.04 |
| 6,161,641 A * | 12/2000 | Fukumura | B60K 28/16 180/197 |
| 8,504,268 B2 | 8/2013 | Baier-Welt et al. | |
| 2008/0149437 A1* | 6/2008 | Herges | B60T 7/12 188/138 |
| 2012/0018240 A1 | 1/2012 | Grubaugh et al. | |
| 2013/0184954 A1 | 7/2013 | Treppenhauer et al. | |
| 2015/0019101 A1 | 1/2015 | Bajorat | |

FOREIGN PATENT DOCUMENTS

| | | |
|---|---|---|
| EP | 2 468 593 A1 | 6/2012 |
| JP | 616123 A * | 1/1994 |
| JP | 2000-71807 A | 3/2000 |
| JP | 2010-95189 A | 4/2010 |
| JP | 2010-163049 A | 7/2010 |
| JP | 2013-154674 A | 8/2013 |

\* cited by examiner

| CONDITION | SCORE |
|---|---|
| ANY ONE OF ABS, TCS, AND VSC ACTUATED WITHIN PREDETERMINED PERIOD IN PAST | a |
| SNOW MODE IS SET | b |
| WIPER IS IN OPERATION | c |
| RAINFALL INFORMATION, SNOWFALL INFORMATION, OR SLIP INFORMATION POSTED ON TRAFFIC SIGN OR ELECTRONIC ROAD SIGN WITHIN PREDETERMINED PERIOD IN THE PAST | d |
| SLIP INFORMATION OR WEATHER INFORMATION ON SNOW OR RAIN RECEIVED REGARDING CURRENTLY TRAVELED ROAD FROM INFORMATION COMMUNICATION SERVICE, SUCH AS ROAD-TO-VEHICLE COMMUNICATION WITHIN PREDETERMINED TIME IN THE PAST. | e |
| OUTSIDE AIR TEMPERATURE BELOW FREEZING POINT | f |
| CURRENT DATE FALLS WITHIN THE WINTER SEASON | g |
| CURRENT TIME IS AFTER SUNSET | h |
| LATITUDE OF CURRENT POSITION IS AT OR ABOVE A PREDETERMINED VALUE | i |
| ALTITUDE OF CURRENT POSITION IS AT OR ABOVE A PREDETERMINED VALUE | j |

FIG. 3

| CONDITION | SCORE |
|---|---|
| OUTPUT VALUE OF LONGITUDINAL ACCELERATION IS AT OR ABOVE A PREDETERMINED VALUE | A |
| DISTANCE DIFFERENCE VALUE OF ALTITUDE INFORMATION IS AT OR ABOVE A PREDETERMINED VALUE | B |
| ROAD GRADIENT VALUE OBTAINED FROM MAP INFORMATION IS AT OR ABOVE A PREDETERMINED VALUE | C |
| NUMERICAL VALUE OF SIGN INDICATING GRADIENT IS AT OR ABOVE A PREDETERMINED VALUE | D |

FIG. 4

| SLIP DEGREE | TIMING WITH WHICH TO START REDUCTION IN BRAKING FORCE |
|---|---|
| LEVEL 1 | W |
| LEVEL 2 | X |
| LEVEL 3 | Y |
| LEVEL 4 | Z |

| SLIP DEGREE | UPPER LIMIT VALUE OF DECREASE TIME OF BRAKING FORCE |
|---|---|
| LEVEL 1 | W |
| LEVEL 2 | X |
| LEVEL 3 | Y |
| LEVEL 4 | Z |

| SLIP DEGREE | DECREASE RATE WHEN REDUCING BRAKING FORCE |
|---|---|
| LEVEL 1 | W |
| LEVEL 2 | X |
| LEVEL 3 | Y |
| LEVEL 4 | Z |

| SLIP DEGREE | REDUCE BRAKING FORCE IN STEPWISE MANNER |
|---|---|
| LEVEL 1 | W |
| LEVEL 2 | X |
| LEVEL 3 | Y |
| LEVEL 4 | Z |

BRAKING CONTROL DEVICE AND BRAKING CONTROL METHOD

CROSS-REFERENCE TO RELATED APPLICATIONS

This application is a U.S. National stage application of International Application No. PCT/JP2015/071257, filed Jul. 27, 2015.

BACKGROUND

Field of the Invention

The present invention relates to a braking control device and a braking control method for automatically controlling a main braking device normally used to brake a host vehicle during travel and a second braking device used to maintain the host vehicle in a stopped state.

Background Information

In a conventional driving assistance system, such as an adaptive cruise control system, control is carried out such that a host vehicle is stopped following deceleration and stopping of a preceding vehicle by automatically controlling a main braking device, which is a hydraulic brake, after which the vehicle is transitioned to a stop holding state. Japanese Laid-Open Patent Application No. 2010-95189 (referred to herein as Patent Document 1) discloses such a conventional travel control device for automatically controlling a main braking device. Here, when the host vehicle is held in a stopped state, the braking force from the main braking device is limited to a set time, after which control is carried out to switch to the second braking device, such as a parking brake. This is because the main braking device increases the hydraulic pressure with a pump to exert the braking force, and thus the durability of the pump is taken into account.

SUMMARY

However, since the second braking device is generally structured to brake only the two rear wheels of the vehicle, when switching from the main braking device to the second braking device, a state in which all four wheels are braked by the main braking device is switched to a state in which only two wheels are braked. However, in situations in which slipping is likely to occur, such as while on road surfaces with a low coefficient of friction or on steeply graded roads, there is the possibility that the vehicle weight cannot be supported, so that the stopped state cannot be maintained. At this time, there is the problem that even if an alarm is sounded to alert the occupant, the time between the sounding of the alarm and the beginning of slipping of the vehicle is too short, so that there is insufficient time for the occupant to operate the main braking device.

In particular, when the vehicle is stopped by a driving assistance system such as an adaptive cruise control system, if the occupant removes the seat belt and opens the door, the driving assistance system undergoes an emergency release, and the main braking device is immediately switched to the second braking device. In this case, the occupant is in a condition unsuitable for driving, such as having an unfastened seat belt or an open door, so that even if the occupant attempts to operate the main braking device in order to stop the vehicle body that is starting to slip, sufficient time for the operation cannot be guaranteed.

Therefore, in view of the circumstances described above, an object of the present invention is to provide a braking control device and a braking control method with which it is possible to ensure that there will be sufficient time for an occupant to operate the main braking device, even if the main braking device is switched to the second braking device in a situation in which slipping tends to occur.

In order to realize the object described above, the braking control device and braking control method according to one embodiment of the present invention predicts a slip degree, which indicates the possibility that a host vehicle will slip, and switches from a main braking device to a second braking device when the host vehicle is in a stop holding state executed by the main braking device. At that time, the timing with which the braking force of the main braking device falls to or below a predetermined value is delayed as the predicted slip degree increases.

According to the present invention, even if the main braking device is switched to the second braking device in a situation in which slipping is likely and the host vehicle begins to slip, since the timing with which the braking force of the main braking device decreases is delayed in accordance with the slip degree, it is possible to ensure that there will be sufficient time for an occupant to operate the main braking device.

BRIEF DESCRIPTION OF THE DRAWINGS

Referring now to the drawings, a braking control system is illustrated.

FIG. 3 is a view for explaining the method of predicting the slip degree by the braking control device according to the first embodiment.

FIG. 4 is a view for explaining the method of predicting the slip degree by the braking control device according to the first embodiment.

DETAILED DESCRIPTION OF THE EMBODIMENTS

The first to the third embodiments to which the present invention is applied are described below with reference to the drawings. In all the embodiments, the same components have been assigned the same reference numbers, and detailed descriptions thereof are omitted.

First Embodiment

Figure 1:
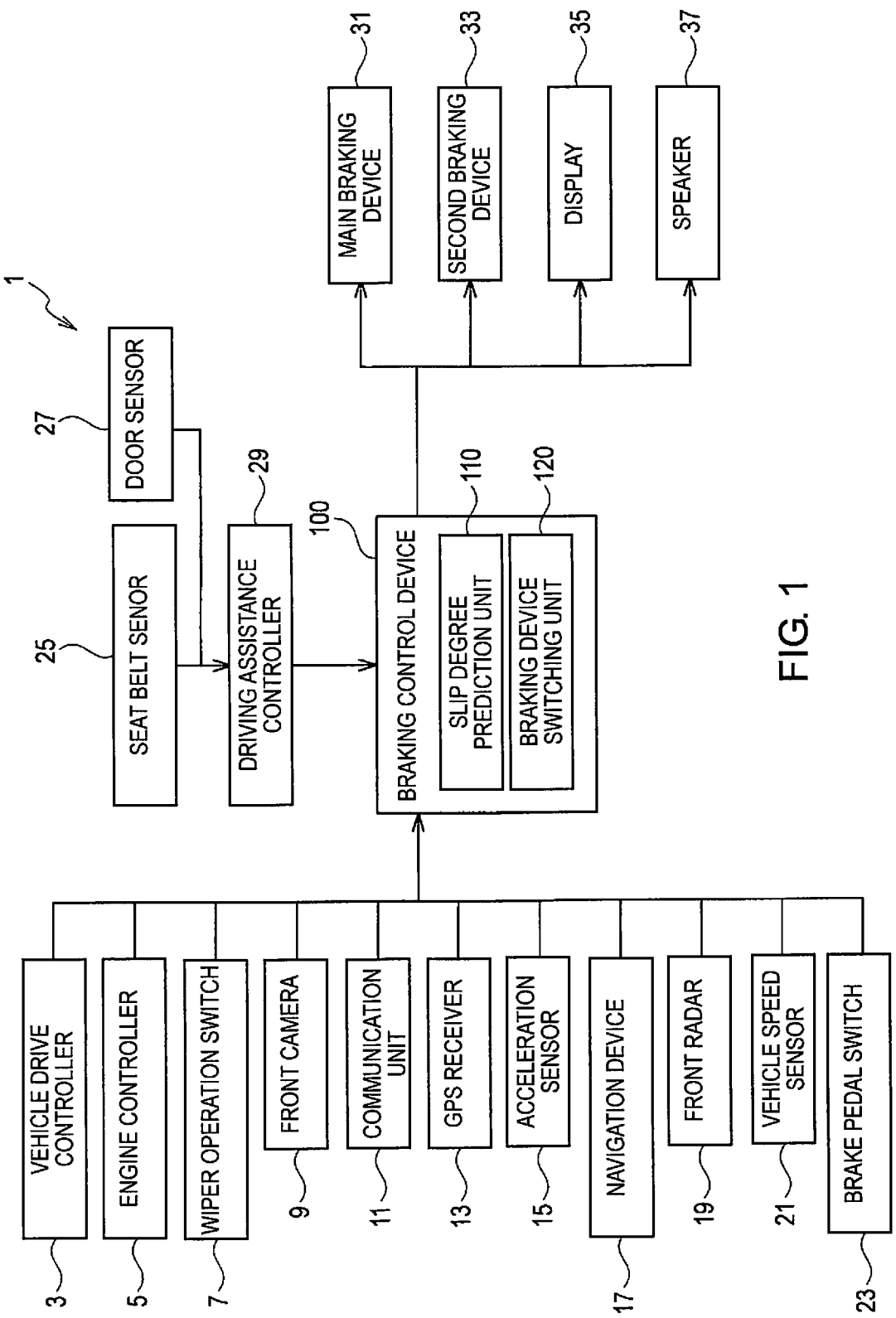
FIG. 1 is a block diagram illustrating the configuration of a braking control system according to a first embodiment.
Figure 2A:
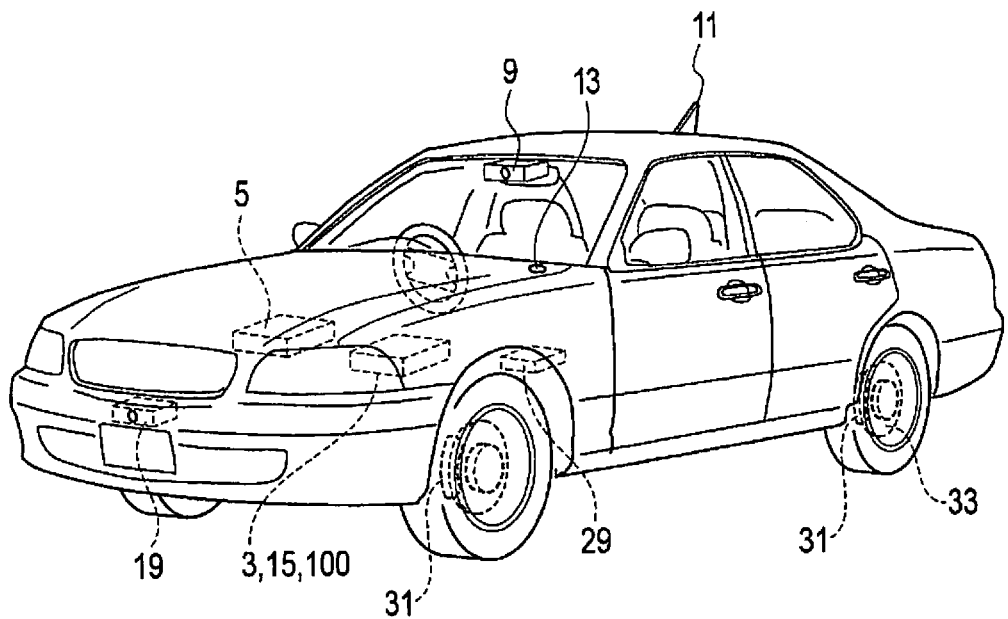
FIGS. 2A and 2B are views of a vehicle for explaining the arrangement of the braking control system according to the first embodiment.
Figure 2B:
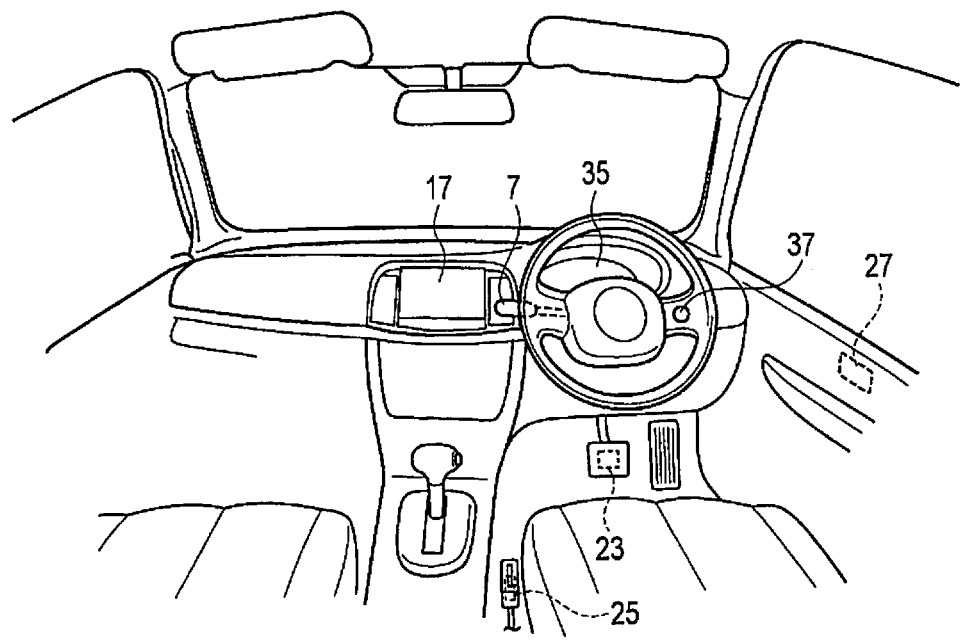

FIG. 1 is a block diagram illustrating the configuration of a braking control system equipped with the braking control device according to the present embodiment. FIG. 2 is a view illustrating the arrangement on the vehicle of the braking control system according to the present embodiment. The braking control system 1 according to the present embodiment comprises a vehicle drive controller 3, an engine controller 5, a wiper operation switch 7, a front camera 9, a communication unit 11, and a GPS receiver 13, as shown in FIG. 1. In addition, the braking control system 1 comprises an acceleration sensor 15, a navigation device 17, a front radar 19, a vehicle speed sensor 21, a brake pedal switch 23, a seat belt sensor 25, and a door sensor 27. Furthermore, the braking control system 1 comprises a driving assistance controller 29, a main braking device 31, a second braking device 33, a display 35, a speaker 37, and a braking control device 100. A braking control system 1 configured in this manner is mounted on a vehicle, and the vehicle in which the system is mounted is equipped with a system, such as an adaptive cruise control system for travel and following a preceding vehicle ahead of the host vehicle.

The vehicle drive controller 3 comprises systems for controlling the driving of the vehicle, such as an anti-lock brake system, a traction control system, a vehicle dynamic control system, and the like.

The engine controller 5 controls the engine. There is a switch for selecting the operating mode of the engine in the vicinity of the driver's seat of the vehicle; when snow mode is selected there, it is possible to prevent slipping of the tires by suppressing a sudden rotation of the engine, even if the accelerator pedal is suddenly depressed while on a road surface with a low coefficient of friction. The state of the engine controller 5 is used to determine whether or not the road surface has a low coefficient of friction.

The wiper operation switch 7 actuates a wiper for wiping away rain, snow, and the like, that have adhered to the front window. The state of the wiper operation switch 7 is used to determine whether or not the road surface has a low coefficient of friction.

The front camera 9 captures an image of what is ahead of the host vehicle and acquires an image. The inter-vehicular distance and the speed of the preceding vehicle relative to the host vehicle are detected from the captured image, and the gradient and slip information displayed on traffic signs and electronic road signs ahead are read. These pieces of information are used to determine whether or not the road surface has a low coefficient of friction and whether or not the road has a steep graded.

The communication unit 11 sends and receives an information communication service that uses road-to-vehicle communication or a mobile telephone line. Of the received information, weather and slip information are used to determine whether or not the road surface has a low coefficient of friction.

The GPS receiver 13 receives information on the current time, in addition to the longitude, latitude, and altitude of the host vehicle via satellite. Northern latitudes tend to be associated with low temperatures, as are high altitudes; therefore, such information can be used to determine whether or not the road surface has a low coefficient of friction. In addition, it is also possible to determine whether or not the road is sloped from the altitude history information.

The acceleration sensor 15 measures the acceleration that is applied to the host vehicle. In a stationary state, it is possible to detect the inclination of the host vehicle by measuring the component of the gravitational acceleration. It is thereby possible to determine whether or not the road is sloped.

The navigation device 17 electronically stores map information, and calculates a guidance route of the host vehicle to the destination. Additionally, the navigation device stores road gradient information.

The front radar 19 uses millimeter waves to measure the inter-vehicular distance and the speed of the preceding vehicle relative to the host vehicle. The vehicle speed sensor 21 measures the vehicle speed of the host vehicle. The brake pedal switch 23 detects whether or not the brake pedal is depressed. The seat belt sensor 25 detects whether or not the seat belt is fastened. The door sensor 27 detects the opened/closed state of the door.

The driving assistance controller 29 controls the automatic driving system and the driving assistance system, such as adaptive cruise control system, emergency brake, auto hold brake, and the like. In addition, a system in which a steering control function is added to the adaptive cruise control system may be provided. The driving assistance controller 29 uses the front camera 9 and the front radar 19 to measure the presence/absence of a preceding vehicle and the inter-vehicular distance, and sends commands to the engine controller 5 and the braking control device 100 to carry out acceleration/deceleration of the host vehicle. Then, if the preceding vehicle stops, the host vehicle is also stopped, and a stop holding control is carried out. The driving assistance controller 29 carries out a vehicle speed control for traveling while a set vehicle speed is held constant when a preceding vehicle is absent, and carries out an inter-vehicular space maintenance control for traveling while the inter-vehicular distance relative to the preceding vehicle is held constant when a preceding vehicle is present.

The main braking device 31 is a brake that is normally used for braking the host vehicle during travel, and increases the hydraulic pressure (brake fluid pressure) with a pump in conjunction with the brake pedal, to press the brake pad against the brake rotor in order to brake the host vehicle. The main braking device 31 is configured to add braking to the four wheels of the host vehicle.

The second braking device 33 is a brake that is used to hold the stopped state of the host vehicle, such as a side brake and a parking brake, and is configured to add braking to the two rear wheels of the host vehicle.

The display 35 displays the system states of the adaptive cruise control system, the emergency brake, the auto hold brake, and the like also has a function of displaying the operating state of the second braking device 33. The speaker 37 outputs vocal sounds synchronously with the display at the time of information presentation or a warning from the adaptive cruise control system, the emergency brake, the auto hold brake, or the like.

The braking control device 100 is a controller that receives a command from the driving assistance controller 29 and automatically controls the main braking device 31 and the second braking device 33 to carry out braking control of the host vehicle. In the present embodiment, the braking control device is integrated with the vehicle drive controller 3 and mounted on the host vehicle. The braking control device 100 operates the main braking device 31 according to commands from the adaptive cruise control system, the emergency brake, and the auto hold brake to carry out stop holding control. Then, when the time limit of the stop holding control is exceeded, the main braking device 31 is switched to the second braking device 33, and the main braking device 31 is released. However, even within the time limit of the stop holding control, if an emergency release condition is detected, such as when the driver's seat belt is released or the door is opened, the main braking device 31 is switched to the second braking device 33, and the main braking device 31 is released. The braking control device 100 having such functions comprises a slip degree prediction unit 110 and a braking device switching unit 120.

The slip degree prediction unit 110 predicts the slip degree, which represents the possibility that the host vehicle will slip. The slip degree takes on a larger value as the possibility of slipping increases, as described below. The slip degree prediction unit 110 calculates a predicted degree of the coefficient of friction, which predicts the coefficient of friction of the road on which the host vehicle travels, calculates a predicted degree of gradient, which predicts the gradient of the road on which the host vehicle travels, and predicts the slip degree by multiplying the two predicted degrees. That is, Slip degree=predicted degree of coefficient of friction×predicted degree of gradient However, the slip degree may be predicted using only the predicted degree of coefficient of friction or only the predicted degree of gradient.

First, the method of calculating the predicted degree of coefficient of friction will be described. The slip degree prediction unit 110 calculates the predicted degree of coefficient of friction by adding the scores of the conditions shown in FIG. 3. That is, Predicted degree of coefficient of friction=$a+b+c+d+e+f+g+h+i+j$.

The slip degree prediction unit 110 assigns a score of a, when there is an operation history of a system that controls the driving or the braking of the host vehicle within a predetermined period in the past, as illustrated in FIG. 3. The target system is at least one of an anti-lock brake system (ABS), a traction control system (TCS), and vehicle stability control (VSC).

Additionally, the slip degree prediction unit 110 assigns a score of b when the traveling mode of the host vehicle is set to snow mode, and assigns a score of c when the wiper of the host vehicle is in an operating state. Furthermore, the slip degree prediction unit 110 assigns a score of d according to road signs around the host vehicle. For example, if any one of rainfall information, snowfall information, and slip information was posted on a traffic sign or an electronic road sign within a predetermined period in the past, a score of d is assigned.

Additionally, the slip degree prediction unit 110 assigns scores of e and f according to surrounding road environment information around the host vehicle. For example, a score of e is given if slip information or weather information related to snow or rain is received regarding the currently traveled road from an information communication service, such as road-to-vehicle communication within a predetermined time in the past, and a score off is assigned if the outside air temperature is below the freezing point.

Furthermore, the slip degree prediction unit 110 assigns scores based on the current date and time; for example, a score of g is assigned if the current date falls in the winter season, and a score of h if the time is after sunset. Additionally, as the position information of the host vehicle, a score of i is assigned if the latitude of the current position is greater than or equal to a predetermined value, and a score of j is assigned if the altitude of the current position is greater than or equal to a predetermined value. The same scores may be set for all of these scores a-j, or higher scores may be set for important conditions.

In this manner, in the predicted degree of coefficient of friction, the score increases as the coefficient of friction of the road on which the host vehicle travels is predicted to be lower. Therefore, the predicted degree of coefficient of friction predicts how low the coefficient of friction of the road on which the host vehicle travels will be.

Next, the method of calculating the predicted degree of gradient will be described. The slip degree prediction unit 110 calculates the predicted degree of gradient by selecting the maximum value from the scores of the conditions shown in FIG. 4. That is, Predicted degree of gradient=MAX($A,B,C,D$)

The slip degree prediction unit 110 assigns a score of A when the output value of the longitudinal acceleration of the acceleration sensor 15 is a predetermined value or greater, as illustrated in FIG. 4. In addition, a score of B is assigned when the distance difference value of the altitude information of the host vehicle $\Delta h/\Delta x$ ($\Delta h$: difference value of altitude, $\Delta x$: difference value of distance) acquired from the GPS receiver 13 is a predetermined value or greater.

Furthermore, the slip degree prediction unit 110 assigns a score of C when the road gradient value in the map information around the host vehicle acquired from the navigation device 17 is a predetermined value or greater. In addition, a score of D is assigned when the numerical value of a sign indicating the gradient in a road sign around the host vehicle is a predetermined value or greater. Different scores are set for these scores A-D, and the highest score of the given scores is calculated as the predicted degree of gradient. However, scores A-D may include the same scores.

In this manner, in the predicted degree of gradient, the score increases as the gradient of the road on which the host vehicle travels is predicted to be greater. Therefore, the predicted degree of gradient predicts the magnitude of the gradient of the road on which the host vehicle travels.

The braking device switching unit 120 carries out a control to switch from the main braking device 31 to the second braking device 33 when the host vehicle is placed in a stop holding state by the main braking device 31 if the time limit of the stop holding control has elapsed or if an emergency release condition of the driving assistance system has been satisfied. At this time, the braking device switching unit 120 delays the timing with which the braking force of the main braking device 31 falls to or below a predetermined value as the slip degree predicted by the slip degree prediction unit 110 increases. Specifically, as a method to delay the timing with which the braking force of the main braking device 31 falls, in the present embodiment, the timing with which to start a reduction in the braking force of the main braking device 31 is delayed. In this manner, since the timing with which the braking force of the main braking device 31 decreases is delayed in accordance with the slip degree, it is possible to ensure that there will be sufficient time for an occupant to operate the main braking device 31, even if the host vehicle begins to slip due to switching of the braking devices.

The braking control device 100 is configured from a general-purpose electronic circuit including a microcomputer, a microprocessor, and a CPU, and peripheral devices such as a memory. Then, the braking control device operates as the slip degree prediction unit 110 and the braking device switching unit 120 described above by means of executing specific programs.

Next, the procedure of the braking control process by the braking control device 100 according to the first embodiment will be described with reference to the flowchart of FIG. 5.

Figure 5:
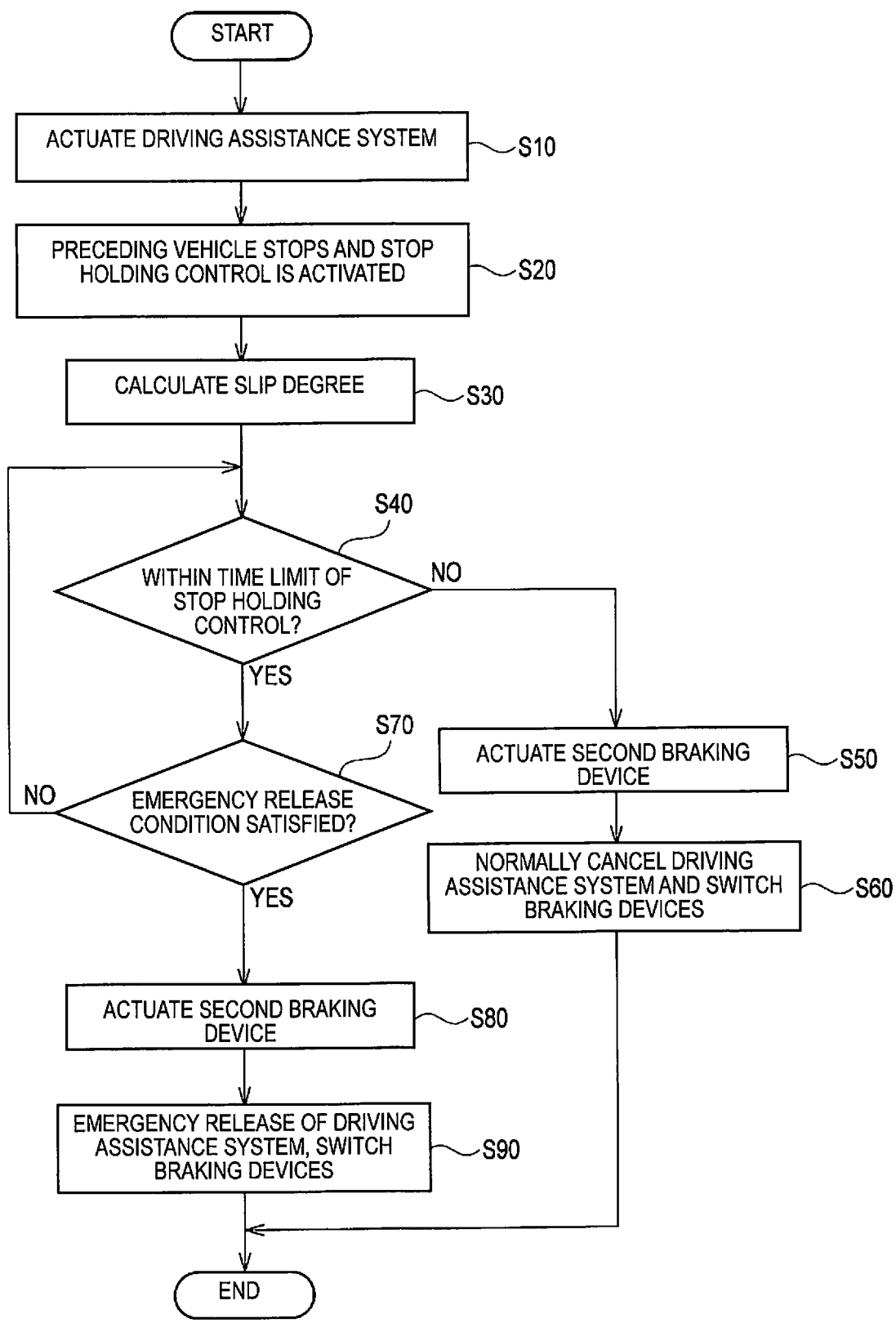
FIG. 5 is a flowchart illustrating the processing flow of a braking control process by the braking control device according to the first embodiment.

First, in Step S10, when a set switch or a resume switch is turned ON by the driver, the driving assistance controller 29 activates a driving assistance system, such as the adaptive cruise control system, as illustrated in FIG. 5. When the drive control is activated, the host vehicle travels while maintaining a constant inter-vehicular distance to the preceding vehicle by a following travel control.

In Step S20, if the preceding vehicle followed by the host vehicle stops, the braking control device 100 automatically controls the main braking device 31 and stops the host vehicle in accordance with a command from the driving assistance controller 29. At this time, the host vehicle stops while maintaining a constant inter-vehicular distance with respect to the preceding vehicle. Then, the braking control device 100 activates a stop holding control and places the host vehicle in the stop holding state by the main braking device 31.

In Step S30, the slip degree prediction unit 110 calculates the slip degree. As described above, the slip degree prediction unit 110 calculates a predicted degree of coefficient of friction, which predicts the coefficient of friction of the road on which the host vehicle travels, and calculates a predicted degree of gradient, which predicts the gradient of the road on which the host vehicle travels, using the tables shown in FIGS. 3 and 4. Then, the slip degree is predicted by multiplying the predicted degree of coefficient of friction and the predicted degree of gradient.

In Step S40, the braking control device 100 determines whether or not the time since the stop holding control was activated is within a time limit. The time limit is a time that is set giving consideration to the robustness of the pump that increases the hydraulic pressure of the main braking device 31. Then, if the time since the stop holding control was activated is not within the time limit, the process proceeds to Step S50, and if within the time limit, the process proceeds to Step S70.

Figure 6:
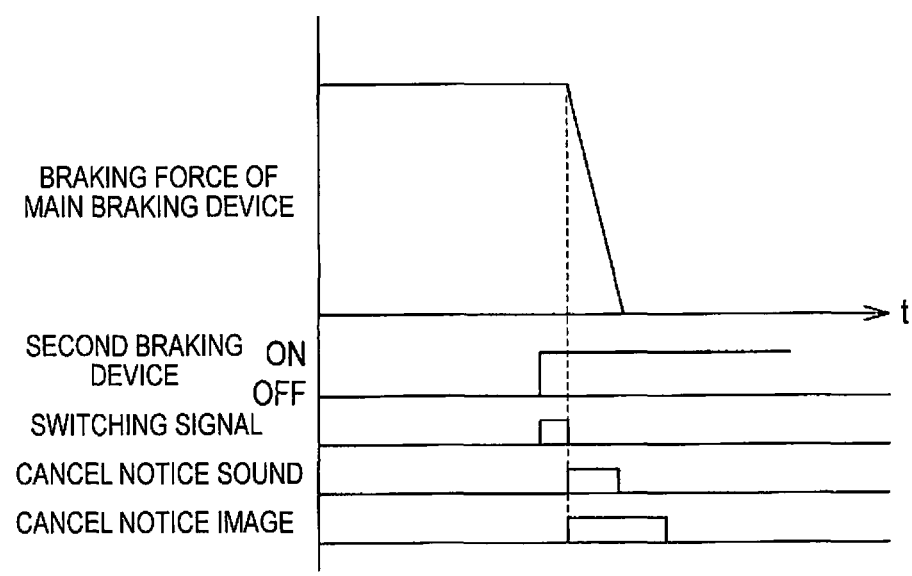
FIG. 6 is a view for explaining the method of switching from the main braking device to the second braking device in a normal state by the braking control device according to the first embodiment.

In Step S50, if the time since the stop holding control was activated exceeds the time limit, the braking device switching unit 120 actuates the second braking device 33. When detecting a switching signal, which is output if the time limit has been exceeded, the braking device switching unit 120 first actuates the second braking device 33, as illustrated in FIG. 6. When the second braking device 33 is actuated, an indicator indicating that the second braking device 33 has been actuated is illuminated on the display 35.

In Step S60, when the second braking device 33 is actuated, the driving assistance controller 29 normally cancels the driving assistance system. Along with the foregoing, the braking device switching unit 120 switches from the main braking device 31 to the second braking device 33. That is, when the second braking device 33 is actuated, the braking device switching unit 120 normally cancels the automatic control of the main braking device 31, which was responsible for the stop holding control up until this point, and quickly withdraws the hydraulic pressure of the brake to reduce the braking force. In addition, when canceling the driving assistance system, a cancel notice image is displayed on the display 35, and a cancel notice sound is output from the speaker 37 to notify the driver. When the main braking device 31 is switched to the second braking device 33 in this manner, the braking control process according to the present embodiment is ended.

On the other hand, in Step S70, the driving assistance controller 29 determines whether or not an emergency release condition has been satisfied. The driving assistance controller 29 determines that an emergency release condition has been satisfied if the seat belt sensor 25 detects that the driver's seat belt has been unfastened, or if the door sensor 27 detects that the driver's side door has been opened. If the emergency release condition has not been satisfied, the process returns to Step S40, and if the emergency release condition has been satisfied, the process proceeds to Step S80.

In Step S80, if it has been detected that the emergency release condition has been satisfied, the braking device switching unit 120 actuates the second braking device 33. When detecting a switching signal, which is output if the emergency release condition is satisfied, the braking device switching unit 120 first actuates the second braking device 33, as illustrated in FIG. 7. When the second braking device 33 is actuated, an indicator indicating that the second braking device 33 has been actuated is illuminated on the display 35.

In Step S90, when the second braking device 33 is actuated, the driving assistance controller 29 immediately cancels the driving assistance system. Accompanying the above, the braking device switching unit 120 switches from the main braking device 31 to the second braking device 33. That is, when the second braking device 33 is actuated, the braking device switching unit 120 immediately cancels the automatic control of the main braking device 31, which was responsible for the stop holding control up to this point, and quickly withdraws the hydraulic pressure of the brake to reduce the braking force. At this time, the braking device switching unit 120 delays the timing with which the braking force of the main braking device 31 falls to or below a predetermined value as the slip degree calculated in Step S30 increases.

Figures 7A, 7B:
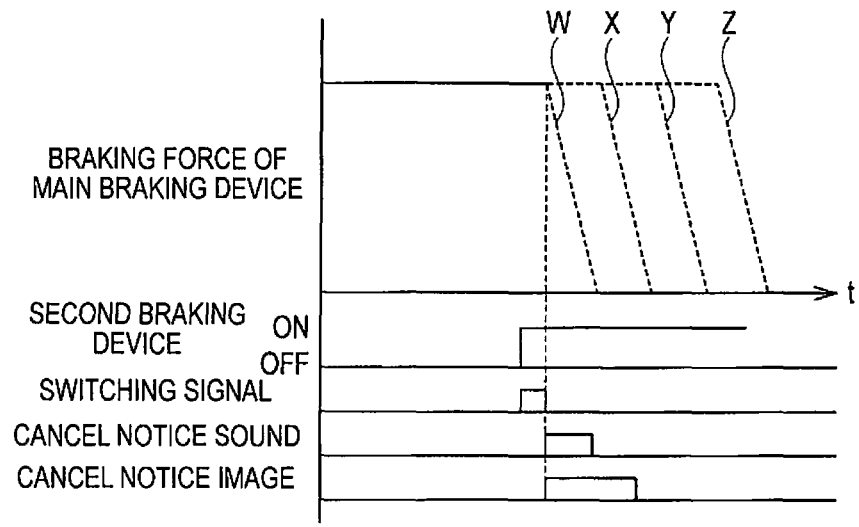
FIGS. 7A and 7B are views for explaining the method of switching from the main braking device to the second braking device in an emergency by the braking control device according to the first embodiment.

First, the slip degree prediction unit 110 classifies the slip degree calculated in Step S30 into four levels, Levels 1 to 4, as illustrated in FIG. 7(b). The method of classification is as follows: three threshold values are set in advance, and the slip degree is categorized as Level 1 when below the lowest threshold value, as Level 2 when at or above the lowest threshold value, as Level 3 when at or above the intermediate threshold value, and as Level 4 when at or above the highest threshold value. That is, Level 1 is a case in which the slip degree is small and the possibility that the vehicle will slip is low, and Level 4 is a case in which the slip degree is large and the possibility that the vehicle will slip is high. However, the number of levels is not necessarily limited to four, and may be more or less than four.

Then, the braking device switching unit 120 delays the timing with which to start a reduction in the braking force of the main braking device 31 in accordance with the categorized levels, as illustrated in FIG. 7(*a*). For example, in the case of Level 1, the timing with which to start a reduction in the braking force will be W, which is the same as in a normal state, but when the slip degree increases and reaches Level 2, the timing with which to start a reduction in the braking force is delayed to X. Then, when the slip degree further increases to Levels 3 and 4, the timing with which to start a reduction in the braking force is further delayed from Y to Z. By delaying the timing with which to start a reduction in the braking force of the main braking device 31 in this manner, the timing with which the braking force of the main braking device 31 falls to or below a predetermined value is delayed. This predetermined value is the value of the braking force of the main braking device 31 when the host vehicle begins to slip due to a reduction in the braking force, which may be obtained in advance by experiment or simulation, or be set on a case-by-case basis according to the slip degree. Since the timing with which the braking force of the main braking device 31 decreases is delayed in this manner, it is possible to ensure that there will be sufficient time for an occupant to operate the main braking device 31, even if the host vehicle begins to slip due to switching from the main braking device 31 to the second braking device 33 on a road with a low coefficient of friction or a road with a steep gradient.

Figures 8A, 8B:
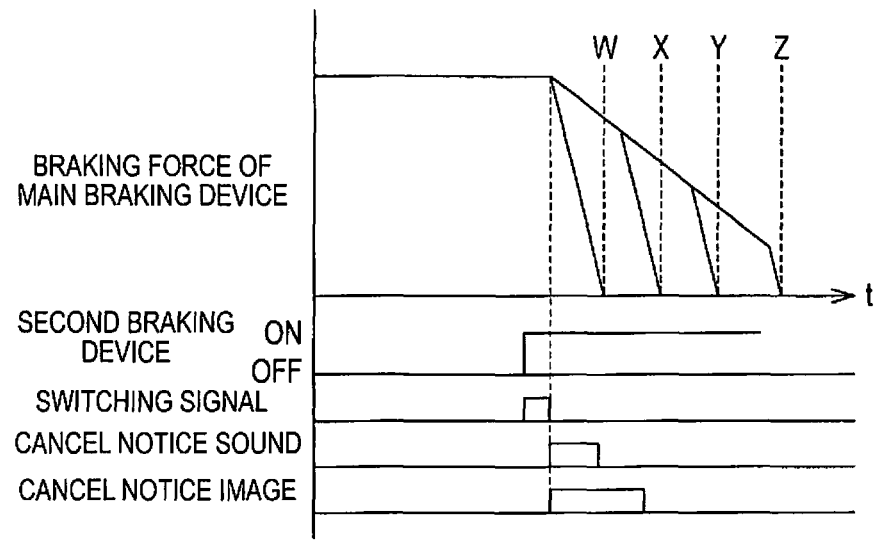
FIGS. 8A and 8B are views for explaining the method of switching from the main braking device to the second braking device in an emergency by the braking control device according to the first embodiment.

Additionally, the braking device switching unit 120 may set an upper limit value for the time until the braking force of the main braking device 31 falls to or below a predetermined value, and this upper limit value may be changed as a function of the slip degree. An upper limit value is set for the time for the braking force to decrease for each level corresponding to the slip degree, as illustrated in FIG. 8(*b*). Then, the braking device switching unit 120 reduces the braking force of the main braking device 31 so as to not exceed these upper limit values, as illustrated in FIG. 8(*a*). For example, the braking force of the main braking device 31 is reduced so as to not exceed the upper limit value W in the case of Level 1, and the braking force of the main braking device 31 is reduced so as to not exceed the upper limit values X, Y, and Z in the cases of Levels 2 to 4, respectively. By providing upper limit values in this manner, it is possible to suppress prolonged use of the main braking device 31 and to reduce failures of the main braking device 31.

At the time of an emergency release of the driving assistance system, a cancel notice image is displayed on the display 35, and a cancel notice sound is output from the speaker 37 to notify the driver. When the main braking device 31 is switched to the second braking device 33 in this manner, the braking control process according to the present embodiment is ended.

Modified Example 1

Figures 9A, 9B:
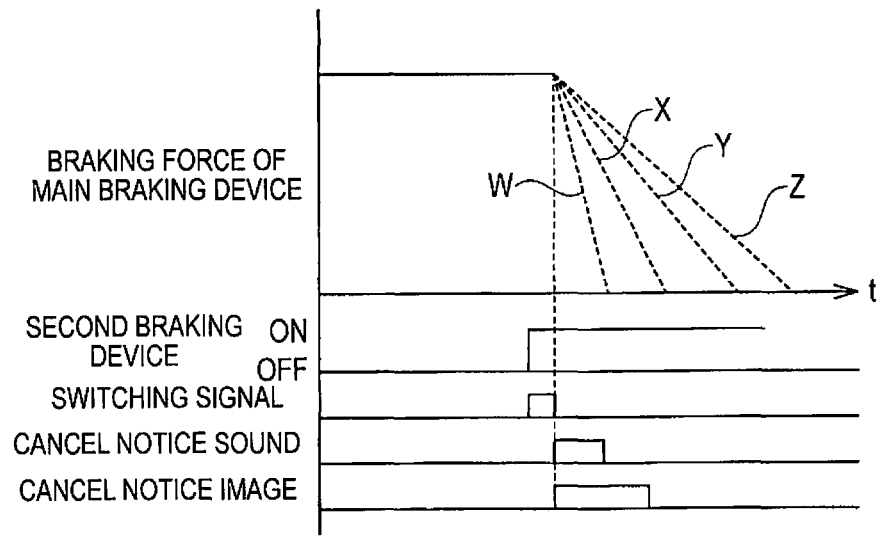
FIGS. 9A and 9B are views for explaining the method of switching from the main braking device to the second braking device in an emergency by the braking control device according to a modified example.

In Modified Example 1, the timing with which the braking force of the main braking device 31 falls to or below a predetermined value is delayed, by reducing the speed at which the braking force of the main braking device 31 is decreased, as illustrated in FIG. 9(*a*). For example, in the case of Level 1, the speed at which the braking force is decreased will be W, which is the same as in a normal state, but when the slip degree increases and becomes Level 2, the speed at which the braking force is decreased is reduced to X. Then, when the slip degree further increases to Levels 3 and 4, the speed at which the braking force is decreased is further reduced from Y to Z. By reducing the speed at which the braking force of the main braking device 31 is decreased in this manner, the timing with which the braking force of the main braking device 31 falls to or below a predetermined value is delayed.

Modified Example 2

Figures 10A, 10B:
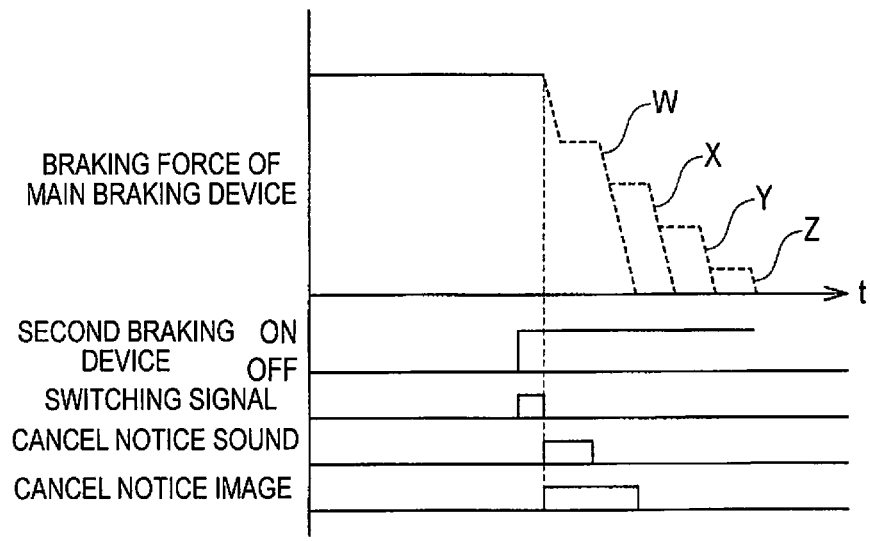
FIGS. 10A and 10B are views for explaining the method of switching from the main braking device to the second braking device in an emergency by the braking control device according to a modified example.

In Modified Example 2, the timing with which the braking force of the main braking device 31 falls to or below a predetermined value is delayed, by reducing the braking force of the main braking device 31 in a stepwise manner, as illustrated in FIG. 10(*a*). For example, in the case of Level 1, the braking force is reduced only once in a stepwise manner as indicated by W, but when the slip degree increases and becomes Level 2, the braking force is reduced twice in a stepwise manner as indicated by X. Then, when the slip degree further increases to Levels 3 and 4, the braking force is reduced three times and four times, as indicated by Y and Z, respectively. In this manner, by reducing the braking force of the main braking device 31 in a stepwise manner, the timing with which the braking force of the main braking device 31 falls to or below a predetermined value is delayed.

As described in detail above, in the braking control device 100 according to the present embodiment, when switching from the main braking device 31 to the second braking device 33, the timing with which the braking force of the main braking device 31 falls to or below a predetermined value is delayed as the slip degree increases. Accordingly, it is possible to ensure that there will be sufficient time for an occupant to operate the main braking device 31, even if the host vehicle begins to slip due to switching from the main braking device 31 to the second braking device 33 on a road surface with a low coefficient of friction or a road with a steep gradient.

In addition, in the braking control device 100 according to the present embodiment, the timing with which the braking force of the main braking device 31 falls to or below a predetermined value is delayed by delaying the timing with which to start a reduction in the braking force of the main braking device 31. Since it is thus not necessary to change the speed at which the brake fluid pressure of the main braking device 31 is released, it is not necessary go through the trouble of adjusting the brake fluid pressure, and the timing with which the braking force of the main braking device 31 decreases can be easily delayed.

Furthermore, in the braking control device 100 according to the present embodiment, the timing with which the braking force of the main braking device 31 falls to or below a predetermined value is delayed by reducing the speed with which the braking force of the main braking device 31 is decreased. Since the braking force of the main braking device 31 is thereby gradually decreased, the occupant is able to grasp the reduction in the braking force and to easily operate the main braking device 31.

Additionally, in the braking control device 100 according to the present embodiment, the timing with which the braking force of the main braking device 31 falls to or below a predetermined value is delayed by reducing the braking force of the main braking device 31 in a stepwise manner. Since the braking force of the main braking device 31 is thereby decreased in a stepwise manner, the occupant is able to ascertain the reduction in braking force, and to easily operate the main braking device 31.

Furthermore, in the braking control device 100 according to the present embodiment, an upper limit value is set for the time until the braking force of the main braking device 31 falls to or below a predetermined value, and this upper limit value is changed according to the slip degree. It is thereby possible to suppress a prolonged use of the main braking device 31 and to reduce failures in the main braking device 31.

Additionally, in the braking control device 100 according to the present embodiment, the slip degree is predicted from the coefficient of friction of the road on which the host vehicle travels. It is thereby possible to reliably predict that the host vehicle will slip and start to move, when switching from the main braking device 31 to the second braking device 33 on a road surface with a low coefficient of friction.

Furthermore, in the braking control device 100 according to the present embodiment, the slip degree is predicted from the gradient of the road on which the host vehicle travels. It is thereby possible to reliably predict that the host vehicle will slip and start to move when switching from the main braking device 31 to the second braking device 33 on a steeply graded road.

Second Embodiment

Next, the braking control device according to the second embodiment of the present invention will be described with reference to the drawings. Since the configuration of the braking control system according to the present embodiment is the same as in the first embodiment, a detailed description thereof is omitted.

The present embodiment is different from the first embodiment in that the braking control process is applied to an emergency brake. An emergency brake drives the main braking device 31 and stops the host vehicle when the driving assistance controller 29 determines a probability of collision with a preceding vehicle from the inter-vehicular distance relative to the preceding vehicle measured by the front camera 9 and determines that the probability of collision is high. The driving assistance controller 29 carries out a stop holding control after the host vehicle is stopped, and, when a predetermined time has elapsed, issues a command to actuate the second braking device 33 and to release the main braking device 31.

Figure 11:
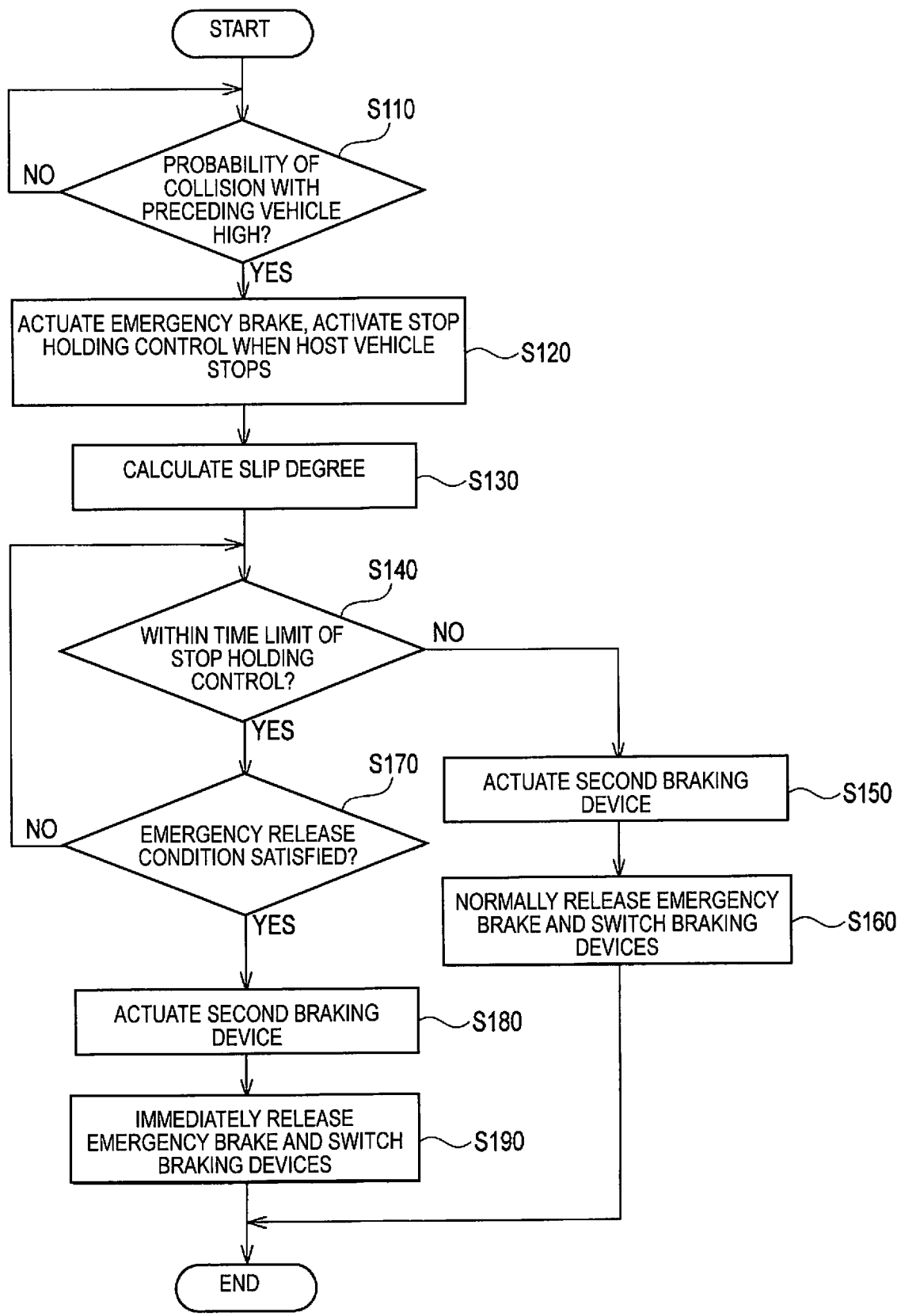
FIG. 11 is a flowchart illustrating the processing flow of a braking control process by the braking control device according to a second embodiment.

In Step S110, the driving assistance controller 29 detects the inter-vehicular distance and the speed relative to the preceding vehicle, based on information from the front camera 9 and the front radar 19, and determines the probability of collision, as illustrated in FIG. 11. Here, if the probability of collision is low, the probability of collision is continued to be determined in Step S110, and if the probability of collision is high, the process proceeds to Step S120.

In Step S120, if actuation of the emergency brake is instructed by the driving assistance controller 29, the brake control controller 100 automatically controls the main braking device 31 to carry out deceleration until the host vehicle stops. Then, when the host vehicle stops, the braking control device 100 activates the stop holding control and places the host vehicle in a stop holding state by the main braking device 31.

Hereinbelow, in the process from Step S130 to Step S190, the same process from Step S30 to Step S90 of the first embodiment illustrated in FIG. 5 is executed. Then, when the emergency brake is normally released in Step S160, or when the emergency brake is immediately released and the main braking device 31 is switched to the second braking device 33 in Step S190, the braking control process according to the present embodiment is ended.

As described in detail above, in the braking control device 100 according to the present embodiment, when switching from the main braking device 31 to the second braking device 33, the timing with which the braking force of the main braking device 31 decreases is delayed according to the slip degree, even when the emergency brake is actuated. Accordingly, it is possible to ensure that there will be sufficient time for an occupant to operate the main braking device 31, even if the host vehicle begins to slip due to switching from the main braking device 31 to the second braking device 33 on a road surface with a low coefficient of friction or a road with a steep gradient.

Third Embodiment

The braking control device according to the third embodiment of the present invention will now be described with reference to the drawings. Since the configuration of the braking control system according to the present embodiment is the same as in the first embodiment, a detailed description thereof is omitted.

The present embodiment is different from the first embodiment in that the braking control process is applied to an auto hold brake. An auto hold brake drives the main braking device 31 to carry out a stop holding control even if the driver is not continuously depressing the brake pedal, when the driving assistance system is not activated and the vehicle is stopped by an acceleration/deceleration operation from the driver. When the accelerator pedal is operated while the vehicle is stopped and held, the stop holding control is canceled and the host vehicle starts.

Figure 12:
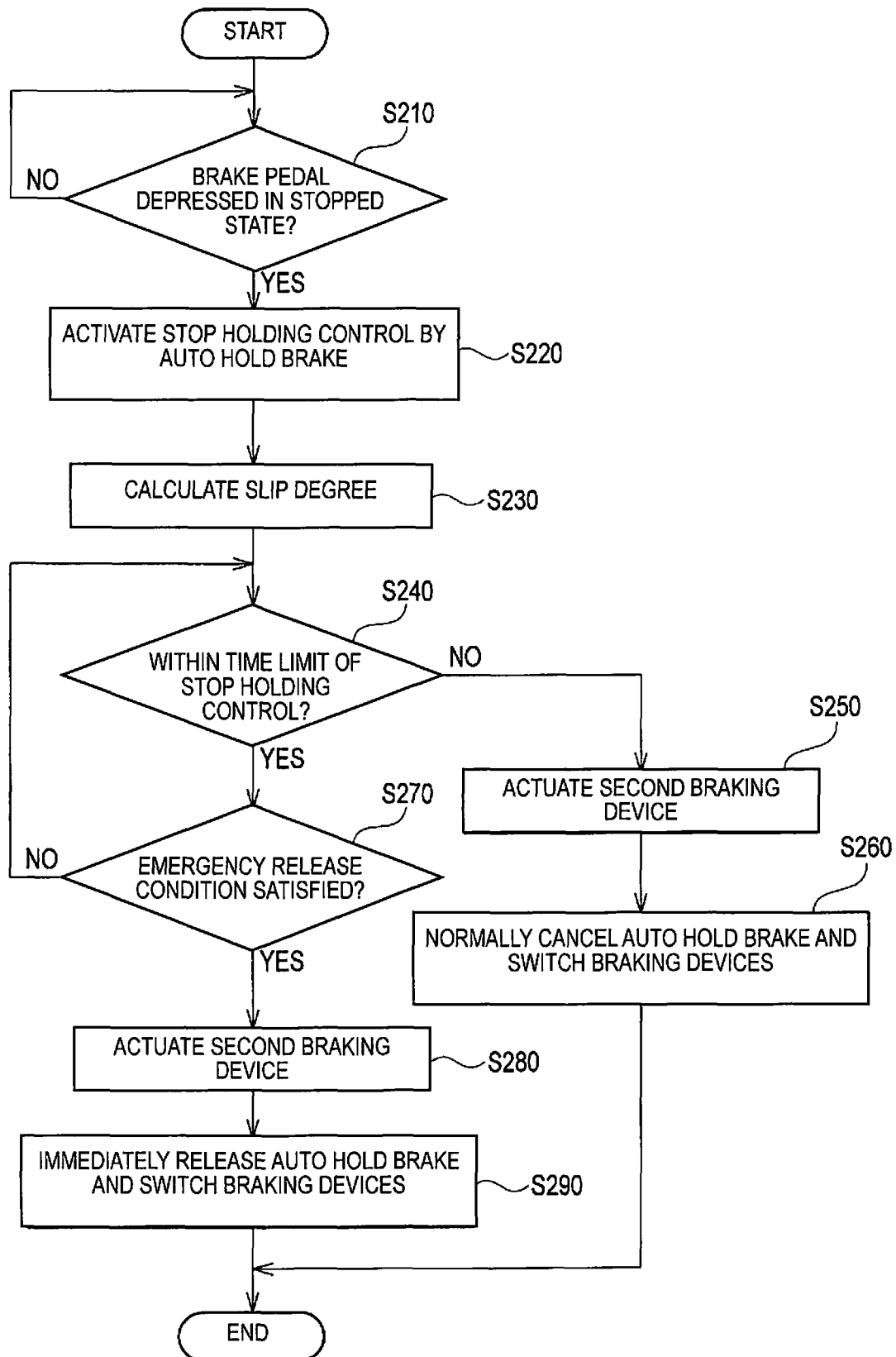
FIG. 12 is a flowchart illustrating the processing flow of a braking control process by the braking control device according to a third embodiment.

In Step S210, the driving assistance controller 29 determines whether or not the driver is depressing the brake pedal while the host vehicle is in a stopped state, based on information from the vehicle speed sensor 21 and the brake pedal switch 23, as illustrated in FIG. 12. Here, if the driver is not depressing the brake pedal, the state of the brake is continued to be determined in Step S210, and if the driver is depressing the brake pedal, the process proceeds to Step S220.

In Step S220, if actuation of the auto hold brake is instructed by the driving assistance controller 29, the brake control controller 100 automatically controls the main braking device 31 with a predetermined brake fluid pressure to execute a stop holding control and places the host vehicle into a stop holding state.

Hereinbelow, in the processing from Step S230 to Step S290, the same processing from Step S30 to Step S90 of the first embodiment illustrated in FIG. 5 is executed. Then, when the auto hold brake is normally released in Step S260 or when the auto hold brake is immediately released and the main braking device 31 is switched to the second braking device 33 in Step S290, the braking control process according to the present embodiment is ended.

As described in detail above, in the braking control device 100 according to the present embodiment, when switching from the main braking device 31 to the second braking device 33, the timing with which the braking force of the main braking device 31 decreases is delayed according to the slip degree, even when the auto hold brake is actuated. Accordingly, it is possible for there to be sufficient time for an occupant to operate the main braking device 31, even if the host vehicle begins to slip due to switching from the main braking device 31 to the second braking device 33 on a road surface with a low coefficient of friction or a road with a steep gradient.

The above-described embodiments are examples of the present invention. Accordingly, the present invention is not limited to the embodiments described above, and various modifications may be made in other forms besides those of the foregoing embodiments insofar as such changes are not outside the technical scope of the present invention.

The invention claimed is:

1. A braking control device for automatically controlling a main braking device normally used to brake a host vehicle during travel and a second braking device used to maintain the host vehicle in a stopped state, the braking control device comprising a controller configured to:
   determine a slip degree;
   predict a possibility that the host vehicle will slip based on the determined slip degree,
   switch from the main braking device to the second braking device when the host vehicle is placed in a stop holding state by the main braking device, and
   when switching from the main braking device to the second braking device, delay a timing with which to start a reduction in a braking force of the main braking device, with respect to the timing with which to start the reduction in the braking force of the main braking device when a slip is not predicted, upon predicting the slip.

2. The braking control device as recited in claim 1, wherein
   the controller is configured to delay the timing with which the braking force of the main braking device falls to or below a predetermined value as the slip degree increases.

3. The braking control device as recited in claim 2, wherein
   the controller is further configured to delay the timing with which the braking force of the main braking device falls to or below the predetermined value by reducing a speed with which the braking force of the main braking device is decreased.

4. The braking control device as recited in claim 2, wherein
   the controller is further configured to delay the timing with which the braking force of the main braking device falls to or below the predetermined value by reducing the braking force of the main braking device in a stepwise manner.

5. The braking control device as recited in claim 2, wherein
   the controller is further configured to set an upper limit value for the timing until the braking force of the main braking device falls to or below the predetermined value, and the upper limit value is changed according to the slip degree.

6. The braking control device as recited in claim 1, wherein
   the controller is further configured to predict the slip degree from a coefficient of friction of a road on which the host vehicle travels, and predicts the slip degree based on at least one of an operation history of a system that controls driving or braking of the host vehicle, a travel mode of the host vehicle, an operating state of a wiper of the host vehicle, a road sign in a vicinity of the host vehicle, host vehicle surrounding road environment information, a current date and time, and position information of the host vehicle.

7. The braking control device as recited in claim 1, wherein
   the controller is further configured to predict the slip degree from a gradient of a road on which the host vehicle travels, and predicts the slip degree based on at least one of an output of an acceleration sensor of the host vehicle, altitude information of the host vehicle, surrounding map information of the host vehicle, and a road sign in a vicinity of the host vehicle.

8. A braking control method of a braking control device for automatically controlling a main braking device normally used to brake a host vehicle during travel and a second braking device used to maintain the host vehicle in a stopped state, the braking control method comprising:
   determining a slip degree;
   predicting a possibility that the host vehicle will slip based on the determined slip degree,
   switching from the main braking device to the second braking device when the host vehicle is placed in a stop holding state by the main braking device, and
   when switching from the main braking device to the second braking device, delaying a timing with which to start a reduction in a braking force of the main braking device, with respect to the timing with which to start the reduction in the braking force of the main braking device when a slip is not predicted, if the slip is predicted.

9. The braking control device as recited in claim 1, wherein
   the controller is configured to delay the timing with which to start the reduction in the braking force of the main braking device upon predicting the slip such that an amount of delay increases as the determined slip degree increases.

10. The braking control method as recited in claim 8, wherein
    the timing with which to start the reduction in the braking force of the main braking device is delayed upon predicting the slip such that an amount of delay increases as the determined slip degree increases.

* * * * *